United States Patent
Lemaire (10) Patent No.: US 11,709,110 B2
(45) Date of Patent: Jul. 25, 2023

(54) METHOD FOR DETECTING A DEFECT IN A ZONE OF INTEREST OF AN OPTICAL LENS

(71) Applicant: Essilor International, Charenton-le-Pont (FR)

(72) Inventor: Cédric Lemaire, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 282 days.

(21) Appl. No.: 17/252,830

(22) PCT Filed: Jun. 21, 2019

(86) PCT No.: PCT/EP2019/066458
§ 371 (c)(1),
(2) Date: Dec. 16, 2020

(87) PCT Pub. No.: WO2019/243568
PCT Pub. Date: Dec. 26, 2019

(65) Prior Publication Data
US 2021/0164864 A1    Jun. 3, 2021

(30) Foreign Application Priority Data

Jun. 21, 2018  (EP) .................................... 18305790

(51) Int. Cl.
*G01M 11/02* (2006.01)
*G06T 7/00* (2017.01)

(52) U.S. Cl.
CPC .... *G01M 11/0264* (2013.01); *G01M 11/0278* (2013.01); *G06T 7/001* (2013.01); *G06T 2207/30164* (2013.01)

(58) Field of Classification Search
CPC .......... G01M 11/0264; G01M 11/0278; G06T 7/001; G06T 2207/30164;
(Continued)

(56) References Cited

U.S. PATENT DOCUMENTS 3,989,387 A * 11/1976 Hategan ............... G01N 21/896
356/430
6,154,274 A   11/2000 Davis et al.
(Continued)

FOREIGN PATENT DOCUMENTS

WO    2011/117539    9/2011

OTHER PUBLICATIONS

International Search Report and Written Opinion of the ISA for PCT/EP2019/066458 dated Sep. 16, 2019, 17 pages.

*Primary Examiner* — Isiaka O Akanbi
(74) *Attorney, Agent, or Firm* — Nixon & Vanderhye (57) ABSTRACT

Method for detecting a defect in a zone of interest of an optical lens, the method including: an image reception step, during which a plurality of images is received, each image includes a view of the zone of interest in front of a plurality of specific patterns, each specific pattern including a bright area and a dark area, and at least one image received is saturated in light intensity; a sampling step, during which each image of the plurality of images are sampled based on a common sampling pattern; a recombination step, during which a recombined image of the zone of interest is determined based on the common sampling pattern; and a defect detection step, during which a defect is detected in the zone of interest of the optical lens based on an analysis of the recombined image.

20 Claims, 3 Drawing Sheets

(58) Field of Classification Search
CPC . G06T 2207/10016; G06T 2207/10144; G06T 7/0004; G06T 7/0008
USPC .................................................... 356/239.2
See application file for complete search history.

(56) References Cited

U.S. PATENT DOCUMENTS

| | | | |
|---|---|---|---|
| 6,201,600 B1* | 3/2001 | Sites | B29D 11/0098 356/124 |
| 6,476,909 B1* | 11/2002 | Nakayama | G01M 11/0278 356/124 |
| 7,256,881 B2* | 8/2007 | Leppard | G01M 11/0235 356/124 |
| 8,081,840 B2 | 12/2011 | Laurent | |
| 2002/0163638 A1* | 11/2002 | Biel | G01M 11/0278 356/239.2 |
| 2003/0137655 A1* | 7/2003 | Wegmann | G01M 11/0285 356/124 |
| 2008/0232637 A1* | 9/2008 | Laurent | G01M 11/02 382/100 |
| 2013/0293726 A1* | 11/2013 | Armstrong-Muntner | G01N 21/958 348/187 |
| 2015/0300912 A1* | 10/2015 | Allione | G01M 11/0285 356/124.5 |
| 2016/0379355 A1* | 12/2016 | Stüwe | G01N 21/90 382/141 |
| 2017/0011507 A1* | 1/2017 | Wong | G01M 11/0285 |
| 2019/0257714 A1* | 8/2019 | Schneider | G01M 11/0235 |

* cited by examiner

METHOD FOR DETECTING A DEFECT IN A ZONE OF INTEREST OF AN OPTICAL LENS

This application is the U.S. national phase of International Application No. PCT/EP2019/066458 filed Jun. 21, 2019 which designated the U.S. and claims priority to EP Patnet Application No. 18305790.0 filed Jun. 21, 2018, the entire contents of each of which are hereby incorporated by reference.

FIELD OF THE INVENTION

The invention relates to a method for detecting a defect in a zone of interest of an optical lens.

The invention further relates to a method for sorting a plurality of optical lenses, a method for comparing a defect in a zone of interest of an optical lens during an optical lens manufacturing process, a method for controlling an optical lens manufacturing process and an apparatus for detecting a defect in a zone of interest of an optical lens.

BACKGROUND OF THE INVENTION

During the different steps of a manufacturing process of an optical lens, various types of defects may appear.

Currently, the cosmetic control of optical lenses is performed manually by an operator, using for example a "referential 17" apparatus or an arc lamp.

Therefore, there is a need for a method allowing an automated cosmetic control of optical lenses, with increased reliability and possibility of storing control data.

One object of the present invention is to provide such method.

Another object of the invention is to provide a method for sorting a plurality of optical lenses, a method for comparing a defect in a zone of interest of an optical lens during an optical lens manufacturing process, a method for controlling an optical lens manufacturing process and an apparatus for detecting a defect in a zone of interest of an optical lens.

SUMMARY OF THE INVENTION

To this end, the invention proposes a method for detecting a defect in a zone of interest of an optical lens, the method comprising:
  an image reception step, during which a plurality of images is received, each image comprises a view of the zone of interest in front of a plurality of specific patterns, each specific pattern comprising a bright area and a dark area, and at least one image received is saturated in light intensity,
  a sampling step, during which each image of the plurality of images are sampled based on a common sampling pattern,
  a recombination step, during which a recombined image of the zone of interest is determined based on the common sampling pattern, and
  a defect detection step, during which a defect is detected in the zone of interest of the optical lens based on an analysis of the recombined image.

Advantageously, the method of the invention allows performing a cosmetic control of optical lenses adapted to detect a defect with an increased reliability and displaying the detected defect with an increased visibility, due to determining a recombined image of the zone of interest based on at least one image saturated in light intensity. The invention is thus particularly adapted to be able to display even diffusing defects.

According to embodiments, the method according to the invention may further comprise one or several of the following features according to any possible combination:
  each image received during the image reception step is saturated in light intensity; and/or
  the method further comprises a set parameter receiving step, during which at least one set parameter is received for each sample according to a given criteria based on the light intensity of the sample in each image; and/or
  during the recombination step, the recombined image of the zone of interest is determined based on the common sampling pattern by selecting for each sample from the plurality of images the corresponding sample based on the at least one set parameter, preferably the corresponding sample having the lowest light intensity; and/or
  the defect is a diffusing defect; and/or
  the view of the zone of interest in front of a specific pattern comprises a secondary pattern which is related to the above-mentioned specific pattern and the plurality of specific patterns is arranged so that the superimposition of the dark areas of all the secondary patterns is a dark area which occupies the entire space of the recombined image of the zone of interest; and/or
  the method further comprises:
    a system providing step, during which a system comprising a display device, a support for an optical lens and an image acquisition device is provided, the system is configured so that when an optical lens is positioned on the support, the display device faces a first side of the optical lens and the image acquisition device faces a second side of the optical lens,
    an optical lens positioning step, during which the optical lens is positioned on the support,
    a specific pattern displaying step, during which the display device displays a specific pattern,
    an image acquisition step, during which the image acquisition device acquires an image comprising a view of the zone of interest in front of said specific pattern, and
    the specific pattern displaying step and the image acquisition step are repeated until each image is acquired; and/or
  at least one specific pattern comprises alternate bright and dark stripes; and/or
  a first specific pattern comprises alternate bright and dark stripes, each stripe extending along a first direction, and a second specific pattern is a translation of the first specific pattern in a second direction sensibly perpendicular to the first direction; and/or
  different specific patterns both comprise alternate bright and dark stripes, the stripes on the first specific pattern are oriented in a first direction, and the stripes on the second specific pattern are oriented in a second direction; and/or
  the method further comprises an image grouping step, during which the plurality of images comprises a first group of images and a second group of images different from the first group of images; and/or
  during the recombination step, a first recombined image of the first group of images is determined based on the common sampling pattern by selecting for each sample from the first group of images the corresponding sample based on the at least one set parameter, preferably the corresponding sample having the lowest light intensity; and/or a second recombined image of the second group of images is determined based on the common sampling pattern by selecting for each sample from the second group of images the corresponding sample based on the at least one set parameter, preferably the corresponding sample having the lowest luminosity; and/or a third recombined image is determined based on the common sampling pattern by selecting for each sample of the first and second recombined images the corresponding sample based on the at least one set parameter, preferably the corresponding sample having the highest luminosity; and/or the dark area of at least one specific pattern has a larger surface than the bright area of said specific pattern; and/or during the image acquisition step, the system is configured so that the luminosity of the secondary pattern on the images is adjusted to have a maximum and a minimum local value, and the minimum local value is lower than 10% of the maximal value; and/or the image acquisition step comprises a camera overexposing step, during which the camera is overexposed so that the image acquired during the image acquisition step is saturated; and/or the method further comprises prior to the image acquisition step a focusing step, during which the image acquisition device is focused on the optical lens, and the depth of field is adjusted so that the zone of interest of the optical lens is in focus; and/or during the image focusing step the specific pattern is out of focus; and/or the zone of interest of the optical lens is the whole optical lens; and/or all specific patterns are periodic translations of each other; and/or at least one specific pattern is a checkered pattern comprising alternate bright and dark elements; and/or the second direction is sensibly perpendicular to the first direction; and/or during the image grouping step, the plurality of images is grouped in a first and a second group of images based on a parameter related to the secondary patterns on each image; and/or the parameter related to the specific patterns is related to a difference in shape, orientation, and/or color between the secondary patterns on each image; and/or the dark area of at least one specific pattern has a surface at least 1.5 times larger than the bright area of said specific pattern; and/or the bright-to-dark surface ratio of at least one specific pattern, preferably of each specific pattern, is at least equal to 1/10, preferably at least equal to 1/6, and at most equal to 1, preferably at most equal to 1/2; and/or on at least one image, preferably on each image, the bright-to-dark surface ratio of the image is at least equal to 30%, preferably at least equal to 70%, most preferably at least equal to 80% and at most equal to 1000%, preferably at most equal to 130%, most preferably at least equal to 120%; said otherwise, the bright-to-dark surface ratio of the image is comprised within the range [30%-1000%], preferably comprised within the range [70%-130%], most preferably comprised within the range [70%-130%]; and/or one surface of the optical lens comprises one or more markings defining a known apparent dimension or distance, and during the image reception step, the one or more markings are visible on at least one image; and/or during the image reception step, at least one dark stripe as viewed through the optical lens has an apparent width, when compared to the dimensions of the optical lens, greater than or equal to 2 mm and smaller than or equal to 3 cm, and more preferably, the at least one dark stripe has an apparent width, when compared to the dimensions of the optical lens, comprised between 5 mm and 2 cm included, for example of about 5 mm to 1 cm included and/or the optical lens is an ophthalmic lens.

It is to be noted that in the invention, the terms "a defect is detected" may also mean that an absence of defect is detected in a particular zone of interest. This is in particular within the meaning of the invention when the term "a defect is detected" is applied to a particular zone of interest where a first defect has been detected in a prior defect detection step.

Moreover, the invention proposes a method for sorting a plurality of optical lenses, the method comprising:

a defect detection step during which at least one defect is detected in the zone of interest of at least one optical lens according to a method for detecting a defect in a zone of interest of an optical lens of the invention, and a sorting step, during which the plurality of optical lenses is sorted based at least on the at least one defect detected during the defect detection step.

Another object of the invention is a method for comparing a defect in a zone of interest of an optical lens during an optical lens manufacturing process, the method comprising:

a first defect detection step during which a defect is detected in the zone of interest of the optical lens according to a method for detecting a defect in a zone of interest of an optical lens of the invention, a modification step, during which the optical lens is modified, a second defect detection step during which a second defect is detected in the zone of interest of the transformed optical lens, and a comparison step, during which the first defect and the second defect are compared.

The method for comparing a defect in a zone of interest of an optical lens during an optical lens manufacturing process may further comprise one or several of the following features according to any possible combination:

the modification step comprises a polishing step; and/or
the modification step comprises a manufacturing step; and/or
the modification step comprises a coating step; and/or
the modification step comprises an edging step.

The invention further proposes a method for controlling an optical lens manufacturing process comprising the steps of:

a) manufacturing an optical lens according to a manufacturing process using a manufacturing device,
b) detecting at least one defect in a zone of interest of the optical lens of step a) according to a method for detecting a defect in a zone of interest of an optical lens of the invention,
c) recording the at least one defect detected in step b),
d) repeating regularly step a) to c) and checking the evolution of the at least one defect detected over time, wherein the evolution of at least one parameter of the manufacturing device used during the optical lens manufacturing process is checked over time and the evolution over time of at least one parameter of the optical lens is related with the evolution over time of the at least one parameter of the manufacturing device.

The invention further proposes an apparatus for detecting a defect in a zone of interest of an optical lens according to a method for detecting a defect in a zone of interest of an optical lens of the invention, the apparatus comprising:

- a memory adapted to store at least two images, each image comprising a view of the zone of interest in front of a specific pattern, the specific pattern corresponding to the first image being different from the specific pattern corresponding to the second image, each specific pattern comprising a bright area and a dark area, for each sample of the zone of interest, at least one image comprising a view of said sample in front of a dark area of a specific pattern, and at least one image being saturated in light intensity,
- an image treatment unit communicating with the memory, the image treatment unit being configured to generate a recombined image based on the at least two images, and
- detection means to detect a defect in the zone of interest of the optical lens based on the recombined image.

The apparatus according to the invention may further comprise:

- a display device facing a first side of the optical lens and configured to illuminate the zone of interest of the optical lens according to a plurality of successive specific patterns comprising a bright area and a dark area; and/or
- an image acquisition device configured to acquire at least two images, each image comprises a view from a second side of the optical lens of the zone of interest in front of a specific pattern.

According to a further aspect, the invention relates to a computer program product comprising one or more stored sequences of instructions that are accessible to a processor and which, when executed by the processor, causes the processor to carry out at least one of the steps of a method according to the invention.

The invention further relates to a computer readable medium carrying one or more sequences of instructions of the computer program product according to the invention.

Furthermore, the invention relates to a program which makes a computer execute at least one of the steps of a method of the invention.

The invention also relates to a computer-readable storage medium having a program recorded thereon; where the program makes the computer execute at least one of the steps of a method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of examples only, and with reference to the following drawings in which.

Elements in the figures are illustrated for simplicity and clarity and have not necessarily been drawn to scale. For example, the dimensions of some of the elements in the

DETAILED DESCRIPTION OF PREFERRED EMBODIMENTS

The invention relates to a method for detecting a defect in a zone of interest of an optical lens. The optical lens may be a spectacle lens, a single vision lens, a bifocal lens, a multifocal lens, a progressive addition lens, an ophthalmic lens, a semi-finished lens, a finished lens, an edged lens, an uncut lens, or a stock lens.

The zone of interest of an optical lens may be the entire optical lens.

Advantageously, the cosmetic control is performed on the entire optical lens.

If the optical lens is an uncut lens which is to be cut during an edging step to the size and shape of an eyeglass frame, the zone of interest may comprise, or consist in, the part of the optical lens intended to be remaining after edging.

If the optical lens is a progressive addition lens, the zone of interest of the optical lens may comprise at least:
a far vision control point FV,
a near vision control point NV,
a main line M starting from one end of the zone of optical interest, ending on the opposite end of the zone of optical interest and passing through the far and near vision control points.

Figure 1:
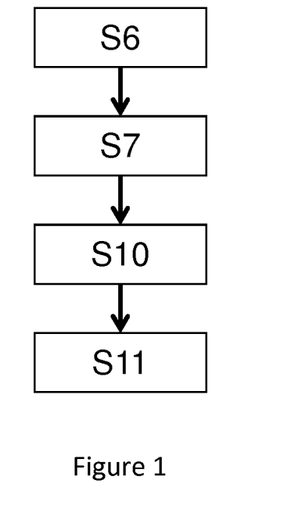
FIG. 1 is a flowchart of different steps of a method for detecting a defect in a zone of interest of an optical lens according to the invention.

As illustrated on FIG. 1, the method according to the invention comprises at least:
an image reception step S6,
a sampling step S7,
a recombination step S10, and
a defect detection step S11.

The zone of optical interest of the optical lens may be determined based on the optical lens either prior to the image reception step S6, such as during acquisition of the images, or during image treatment, that is during the sampling step S7, or during the recombination step S10, or during the defect detection step S11.

During the image reception step S6, a plurality of images is received. Each image comprises a view of the zone of interest in front of a specific pattern.

The view of the zone of interest in front of a specific pattern comprises a secondary pattern which is related to the above-mentioned specific pattern. The secondary pattern may be modulated by the possible saturation of light intensity, by the presence of a defect within or on the optical lens, by the optical power of the optical lens and/or by any optical factors linked to the apparatus used for taking the image and representing it.

At least two images correspond to different specific patterns. According to the method of the invention, at least one image received is saturated in light intensity, and preferably, at least two of the images received are saturated in light intensity.

The luminosity varies in each specific pattern with position and has a maximum (Max) and a minimum (Min) local value. The contrast of each specific pattern is such that the minimum local value is lower than 10% of the maximal value.

Each specific pattern comprises a bright area and a dark area. In the sense of the invention, a "dark area" of a specific pattern is an area which local luminosity values do not exceed 20% of the maximum value, and a "bright area" of a specific pattern is an area which local luminosity values are over 80% of the maximum value.

In the sense of the invention, an image saturated in light intensity has a higher bright-to-dark surface ratio than the corresponding specific pattern.

Advantageously, a saturated image comprises a less extended "gray" zone, intermediate between bright and dark, compared to a non-saturated image, which facilitates subsequently identifying a defect based on said image.

In an embodiment, each image received is saturated in light intensity.

In embodiments, the plurality of specific patterns is arranged so that the superimposition of the dark areas of all the secondary patterns is a dark area which occupies the entire space of the recombined image of the zone of interest.

Advantageously, when subsequently recombining an image, the method allows detecting a defect with a high reliability in the entire zone of interest, due to the superimposition of the dark areas of all the secondary patterns occupying the entire space of the zone of interest.

In embodiments, at least one specific pattern comprises alternate bright and dark stripes, and/or at least one specific pattern is a checkered pattern comprising alternate bright and dark elements In embodiments, a first specific pattern comprises alternate bright and dark stripes, each stripe extending along a first direction, and a second specific pattern is a translation of the first specific pattern in a second direction sensibly perpendicular to the first direction. In embodiments, all specific patterns are striped patterns and periodic translations of each other in a direction perpendicular to the direction along which the stripes extend.

In embodiments, the width of the stripes is equal in the two images corresponding respectively to the first and the second specific pattern.

In embodiments, the dark zones originating from the two images corresponding respectively to the first and the second specific pattern correspond to similar light intensity in the subsequently recombined image. Advantageously, a defect is detected more easily and better visualized due to the dark zones having similar homogeneity, as the defect appears bright on a dark homogeneous background.

In embodiments, different specific patterns both comprise alternate bright and dark stripes, the stripes on the first specific pattern are oriented in a first direction, and the stripes on the second specific pattern are oriented in a second direction. The second direction may be perpendicular to the first direction. Advantageously, the method allows clearly detecting defects having any orientation, due to the stripes extending in two different directions. Indeed, the defects that are best detected are the ones extending in a direction corresponding to the highest gradient of light intensity on an image. Advantageously those different types of patterns are applied using at least two sets of patterns, each set of patterns comprising at least two specific patterns which are a translation of each other, and each set of patterns is used to provide at least two secondary patterns based on at least two different specific patterns of the same set of patterns.

In embodiments, the dark area of at least one specific pattern has a larger surface than the bright area of said specific pattern. Preferably, the dark area of at least one specific pattern may have a surface at least 1.5 times larger than the bright area of said specific pattern.

Each specific pattern has a bright-to-dark surface ratio corresponding to the surface of the bright area divided by the surface of the dark area. In embodiments, the bright-to-dark surface ratio of at least one specific pattern, preferably of each specific pattern, is at least equal to 1/10, preferably at least equal to 1/6, and at most equal to 1, preferably at most equal to 1/2.

Advantageously, maximizing the surface of the dark area with respect to the bright area of a specific pattern, while still keeping a sufficient surface of the bright area for a sufficient global light intensity, allows detecting a defect based on a minimal number of images.

Each image also has a bright-to-dark surface ratio, corresponding to the surface of the bright area of the corresponding specific pattern as seen through the zone of interest of the lens on the image divided by the surface of the dark area of the corresponding specific pattern as seen through the zone of interest of the lens on the image.

The bright-to-dark surface ratio of the image may be different than the bright-to-dark ratio of the corresponding specific pattern. For example, if an image is acquired while underexposing the image acquisition means, then the bright-to-dark surface ratio of the image is lower than that of the corresponding specific pattern. On the contrary, if an image is acquired while overexposing the image acquisition means, then the bright-to-dark surface ratio of the image is higher than that of the corresponding specific pattern.

In embodiments, on at least one image, preferably on each image, the bright-to-dark surface ratio of the image is at least equal to 30%, preferably at least equal to 70%, most preferably at least equal to 80% and at most equal to 1000%, preferably at most equal to 130%, most preferably at least equal to 120%. Said otherwise, the bright-to-dark surface ratio of the image is comprised within the range [30%-1000%], preferably comprised within the range [70%-130%], most preferably comprised within the range [70%-130%].

For each specific pattern, a characteristic dimension related to the dark-to-bright surface ratio of the specific pattern may be determined.

For example, if the specific pattern is a periodic repetition of an elementary pattern consisting of one dark stripe and one bright stripe, the dark-to-bright surface ratio may be calculated by dividing the width of a dark stripe by the width of a bright stripe.

According to this example, the width of a dark stripe is a characteristic dimension of the specific pattern related to the dark-to-bright surface ratio of the specific pattern.

Similarly, for each image, a characteristic dimension related to the dark-to-bright surface ratio of the image may be determined.

According to this example, if the image is saturated, then the width of a dark stripe on the image with regard to an apparent known dimension of the zone of interest of the lens is lower than the width of the same dark stripe on the specific pattern with regard to a known dimension of the specific pattern.

In embodiments, at least one dark stripe as viewed through the optical lens has an apparent width greater than or equal to 2 mm and smaller than or equal to 3 cm, in particular, comprised between 5 mm and 2 cm included, for example of about 5 mm to about 1 cm included. In the sense of the invention, an apparent dimension or an apparent distance on an image corresponds to a dimension or distance on the image scaled relatively to a known dimension or distance on one surface of the optical lens visible on the image, such as a known distance between markings on one surface of the optical lens, or such as a known lens diameter.

The inventors found that the best results are obtained with the provided bright-to-dark surface ratios, which also correspond to the provided apparent width of the dark stripes in the case of striped specific patterns, as defects, particularly diffusing defects, across the entire lens are clearly visible on a recombined image based on a minimal number of images. Conversely, in some cases, if the dark zones are wider, some defects may not be detected, and if the dark zones are too thin, or the bright to dark ratio too big on the image, some defects may be artificially observed which do not exist in reality.

During the sampling step S7, each image of the plurality of images are sampled based on a common sampling pattern. In embodiments, the common sampling pattern forms for each image a grid of samples, or a pixel grid.

During the recombination step S10, a recombined image of the zone of optical interest is determined based on the common sampling pattern. In other words, the recombined image of the zone of optical interest is determined by selecting one sample among the plurality of images sampled during the sampling step S7 for each position on the common sampling pattern. The selection is based on a criteria adapted to the visualization of a defect on the recombined image.

Advantageously, the recombined image comprises the whole zone of interest of the optical lens.

During the defect detection step S11, a defect is detected in the zone of interest of the optical lens based on an analysis of the recombined image.

In an embodiment, a defect may be detected by comparing on the recombined image a local value of a parameter with the average value of the parameter in the whole zone of interest, wherein the parameter may comprise luminance and/or gradient of luminance.

If such comparison amounts to a difference above a predefined threshold value, then it is considered that a defect is detected.

If such comparison amounts to a difference below a predefined threshold value, then it is considered that no defect is detected.

The nature of a detected defect may be identified from the shape of said defect, indeed if said defect is line-shaped, then the defect is identified as a scratch, whereas if said area is substantially punctual, then the defect is identified as an inclusion or a mark.

In embodiments, the defect is a diffusing defect, such as a speck of dust or a scratch.

The recombined image may be subject to image treatments such as filtering, color inverting, grayscaling, sharpening, and/or altering the brightness, contrast, saturation, vibrance, exposure and/or gamma of the recombined image, in order to best detect and/or display a defect.

Figure 2:
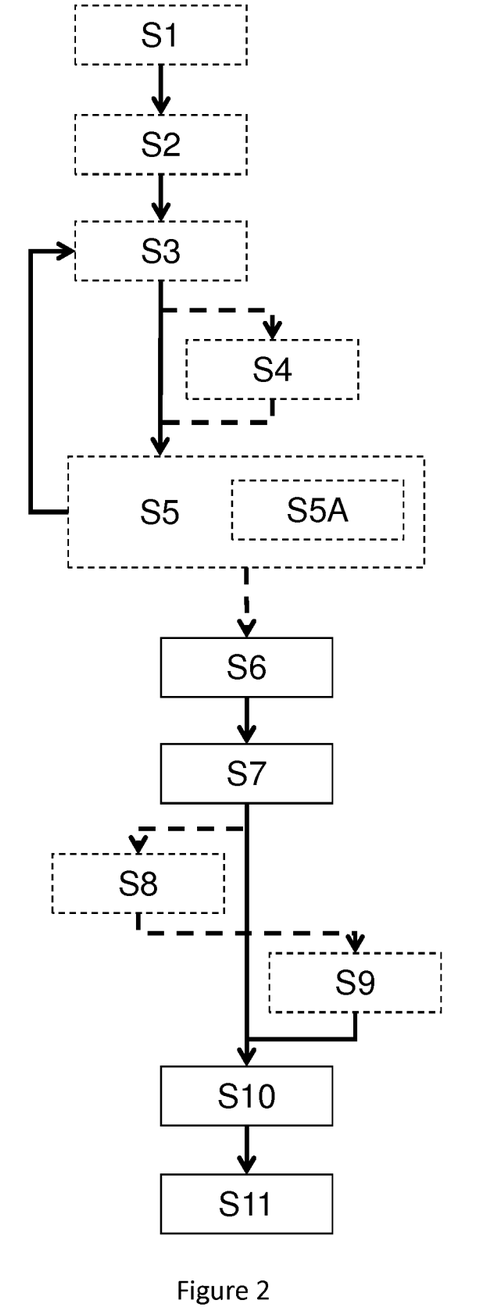
FIG. 2 is a flowchart of different steps of a method for detecting a defect in a zone of interest of an optical lens according to an embodiment of the invention.

As illustrated on FIG. 2, the method according to the invention may further comprise:
 a system providing step S1,
 an optical lens positioning step S2,
 a specific pattern displaying step S3, and
 an image acquisition step S5.

During the system providing step S1, a system comprising a display device, a support for an optical lens and an image acquisition device is provided. An example of such system is illustrated on FIG. 8.

Examples of display devices include projectors, flat screens, monitors, LCD displays, and the like.

Example of image acquisition devices include any optical instrument for recording or capturing an image, such as a camera.

Moreover, the system is configured so that when an optical lens is positioned on the support, the display device faces a first side of the optical lens and the image acquisition device faces a second side of the optical lens opposed to the first side. Thus, the system is configured so that when an optical lens is positioned on the support, the image acquisition device may acquire a view of content displayed by the displayed device seen through the optical lens.

During the optical lens positioning step S2, the optical lens is positioned on the support.

During the specific pattern displaying step S3, the display device displays a specific pattern.

During the image acquisition step S5, the image acquisition device acquires an image comprising a view of the zone of interest in front of said specific pattern.

In addition, the specific pattern displaying step S3 and the image acquisition step S5 are repeated until each image is acquired.

In embodiments, the system is configured so that the luminosity of the images of the specific patterns on each image is adjusted to have a maximum and a minimum local value, and the minimum local value is lower than 10% of the maximal value.

Advantageously, increasing the contrast of the images improves detecting a defect, as the defect appears bright in front of a dark zone of a specific pattern.

In embodiments, the image acquisition step S5 comprises a camera overexposing step S5A, during which the camera is overexposed so that the image acquired during the image acquisition step is saturated.

Advantageously, overexposing images contributes to increasing the contrast of the images, and more particularly contributes to increase the detection of diffusing defects which are otherwise difficult to detect.

The image acquisition device or camera has a restricted but configurable dynamic, for example, it may be configured to generate a gray level image (pixels ranging from 0 to 255) for a brightness varying from X to Y. The values X and Y depend on the camera and its configuration.

Which means that:
any brightness captured by the camera below X will be transformed by the camera by pixels set at 0 so saturated/underexposed.
any brightness captured by the camera above Y will be transformed by the camera by pixels set at 255 so saturated/overexposed.

The inventors have tested a configuration that makes sure that the bright zones of the specific pattern are transformed by the camera in pixels set at 255.

In addition, the dark zones of the specific pattern are transformed by the camera with "well-exposed" pixels, set at around 128 which is the middle of the camera's rendering range.

The above-mentioned values are only examples are may be adapted by the skilled person according to the needs.

"Overexposing an image" is to be understood as having the exposure time of the image such that the part of the image corresponding to the bright zones of said image are overexposed in view of the settings of the camera; meaning that they reach or goes over a brightness value corresponding to the maximum brightness value which is possible to capture using the said camera.

The method may further comprise prior to the image acquisition step a focusing step S4, during which the image acquisition device is focused on the optical lens, and the depth of field is adjusted so that the zone of interest of the optical lens is in focus. In addition, the specific pattern itself may be out of focus.

Advantageously, a clear image of the zone of interest of the optical lens is obtained, and the detected defects are clearly visible.

As illustrated on FIG. 2, the method according to the invention may further comprise a set parameter receiving step S8.

During the set parameter receiving step S8, at least one set parameter is received for each sample according to a given criteria based on the light intensity of the sample in each image.

During the recombination step 10, the recombined image of the zone of interest may be determined based on the common sampling pattern by selecting for each sample of the recombined image one of the corresponding samples from the plurality of images chosen based on the at least one set parameter. By corresponding sample, it is meant a sample of the common sampling pattern corresponding to the same coordinates in the common sampling pattern, and the same position relative to the optical lens.

For example, let us consider X images, each image being sampled according to a common sampling pattern corresponding to a pixel grid of Y times Z pixels. Each pixel may be referred to with a unique identifier $YZ_X$ based on its position and the image it originates from.

Then according to this embodiment, the recombined image determined during the recombination step S10 comprises Y times Z pixels, disposed according to the common sampling pattern and may be referred to as $YZ_R$. Moreover, each $YZ_R$ pixel has corresponding $YZ_X$ pixels, for each of the X images and having the same values for Y and Z as the $YZ_R$ pixel. Furthermore, the selection between the $YZ_X$ pixels to be used as the $YZ_R$ in the recombined image is performed based on the set parameter.

In an embodiment, each sample of the recombined image selected from the plurality of images is the corresponding sample having the lowest light intensity.

Referring to the above example, the recombined image determined during the recombination step S10 comprises Y times Z $YZ_R$ pixels, disposed according to the common sampling pattern, each $YZ_R$ pixel being the $YZ_X$ pixel among the X images with the same Y and Z values as the $YZ_R$ pixel and the lowest luminosity.

Advantageously, the recombined image shows the defects as bright singularities on a dark background.

As illustrated on FIG. 2, the method according to the invention may further comprise an image grouping step S9.

During the image grouping step S9, the plurality of images comprises at least a first group of images and a second group of images different from the first group of images. The plurality of images may comprise any number of different groups of images. The groups of images may be mutually exclusive. In other words, any image comprised in the first group of images may not also be comprised in the second group of images and vice versa.

The plurality of images may be grouped in a first and a second group of images based on a parameter related to the secondary patterns on each image. The parameter related to the secondary patterns may be related to a difference in shape, orientation, and/or color between the patterns formed by the dark zones and bright zones on each image.

Advantageously, the method allows for analyzing subsets of images and generating a recombined image for each subset of images, possibly according to different criteria.

In an embodiment, the method comprises both a set parameter receiving step S8 and an image grouping step S9.

According to this embodiment, during the recombination step, a first recombined image of the first group of images may be determined based on the common sampling pattern by selecting for each sample from the first group of images the corresponding sample based on the at least one set parameter, preferably the corresponding sample having the lowest light intensity.

Moreover, a second recombined image of the second group of images may be determined based on the common sampling pattern by selecting for each sample from the second group of images the corresponding sample based on the at least one set parameter, preferably the corresponding sample having the lowest luminosity.

Furthermore, a third recombined image may be determined based on the common sampling pattern by selecting for each sample of the first and second recombined images the corresponding sample based on the at least one set parameter, preferably the corresponding sample having the highest luminosity, or alternatively by addition of the luminosity of each sample from each of the two recombined images.

Advantageously, defects which are displayed differently depending on a specific parameter related to the secondary patterns may be successfully detected only due to first determining separate recombined images of different image subsets. In other words, some defects may be difficult to detect using one type of specific patterns while being detected using a second type of specific patterns. Accordingly, forming a third recombined image based on a first recombined image based on images formed using a first type of specific pattern and based on a second recombined image based on images formed using a second type of specific pattern enables to identify all defects detected within the first recombined image and all defects detected within the second recombined image, even defects not detected or minimized by using either one of the specific patterns.

For example, a specific pattern of lines oriented along an X axis may help to detect punctual or X-oriented defects while being less adapted to defects oriented perpendicular to the X-axis, for example along an Y-axis and conversely. Accordingly, forming a third recombined image based on a first recombined image based on images formed using a specific pattern of lines oriented along an X axis and based on a second recombined image based on images formed using a specific pattern of lines oriented along an Y axis, perpendicular to the X-axis, enable to identify evenly defects that are purely along the X-axis or purely along the Y axis.

In further examples, some defects may be detected better using smaller dark zones while some defects may be detected using wider dark zones. Or some types of defects might be better detected when the dark zones forms lines or strips, while some other types of defects might be better detected when the dark zones forms circles or waves.

Another object of the invention is a method for sorting a plurality of optical lenses.

Figure 3:
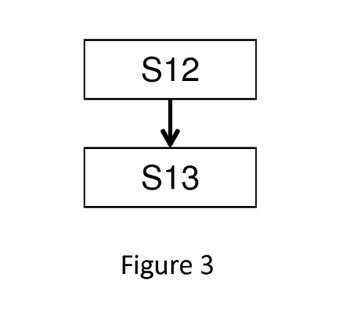
FIG. 3 is a flowchart of different steps of a method for sorting a plurality of optical lenses according to the invention.

As illustrated on FIG. 3, the method for sorting a plurality of optical lenses according to the invention comprises at least:
 a defect detection step S12, and
 a sorting step S13.

The defect detection step S12 may comprise the steps of a method for detecting a defect according to the invention.

During the sorting step S13, the plurality of optical lenses is sorted based at least on the at least one defect detected during the defect detection step, Advantageously, the plurality of optical lenses is sorted in an automated way, based on an automated detecting method of a defect.

The plurality of optical lenses may be sorted based on a parameter related to the detection of a defect in the optical lens, including any of the following or a possible combination thereof: the occurrence of a defect, the number of the detected defects, the occurrence of a defect in a specific position, the occurrence and/or number of a specific type of defect, the occurrence and/or number of a defect having a dimension exceeding a predetermined dimension, and the like.

Another object of the invention is a method for comparing a defect in a zone of interest of an optical lens during an optical lens manufacturing process.

Figure 4:
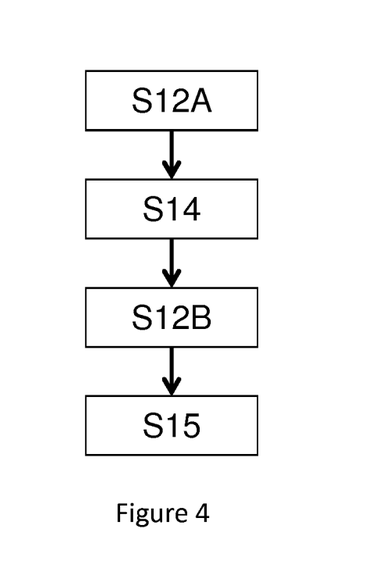
FIG. 4 is a flowchart of different steps of a method for comparing a defect in a zone of interest of an optical lens during an optical lens manufacturing process according to the invention.

As illustrated on FIG. 4, the method for comparing a defect in a zone of interest of an optical lens during an optical lens manufacturing process according to the invention comprises at least:
 a first defect detection step S12A,
 a modification step S14,
 a second defect detection step S12B, and
 a comparison step S15.

Advantageously, the manufacturing process of optical lenses is monitored based on the detection of defects in a single lens undergoing different steps of the manufacturing process.

The first and the second defect detection step S12A and S12B may each comprise the steps of a method for detecting a defect according to the invention. In an embodiment, both steps are performed in the same manner. Advantageously, the reliability of the method in detecting a single defect yields reproducible results.

The modification step S14 may comprise any type of modification of the optical lens, including adding material to, removing material and/or conferring a specific function to the optical lens.

Figure 5:
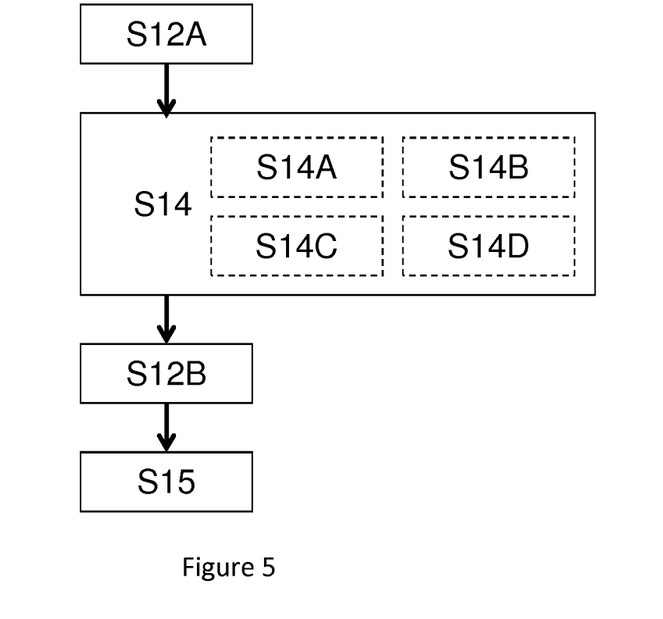
FIG. 5 is a flowchart of different steps of a method for comparing a defect in a zone of interest of an optical lens during an optical lens manufacturing process according to an embodiment of the invention.

As illustrated on FIG. 5, the modification step may comprise a polishing step S14A and/or a manufacturing step S14B and/or a coating step S14C and/or an edging step S14D. The manufacturing step S14B may comprise surfacing one of the face of the optical lens and/or adding material to the optical lens by additive manufacturing so as to change the optical power of the optical lens.

During the comparison step S15, at least one defect detected during the first defect detection step S12A is compared with at least one defect detected during the second defect detection step S12B. The comparison may involve a comparison on a parameter related to at least one defect. The parameter may include any of the following or any possible combination thereof: the occurrence of a defect, the number of the detected defects, the occurrence and/or number of a defect in a specific position, the occurrence and/or number of a specific type of defect, the occurrence of a defect having a dimension exceeding a predetermined dimension, and the like. The comparison step S15 may output noting the appearance of new defects, the disappearance of defects, noting some defects which are un-touched and/or a modification of some defects. This output may be done generally or for some specific type of defects and/or for some defects in specific areas of the lens.

Another object of the invention is a method for controlling an optical lens manufacturing process.

Figure 6:
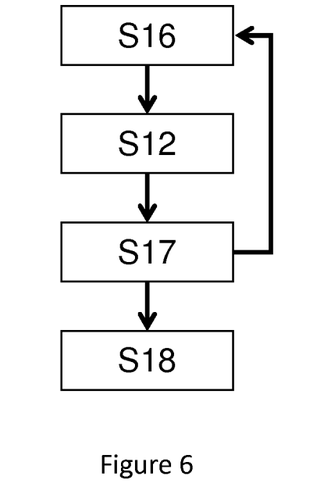
FIG. 6 is a flowchart of different steps of a method for controlling an optical lens manufacturing process according to the invention.

As illustrated on FIG. 6, the method for controlling an optical lens manufacturing process according to the invention comprises at least:
 a manufacturing step S16,
 a defect detection step S12,
 a recording step S17, the steps S16, S12 and S17 being regularly repeated, and a defect evolution checking step S18.

Advantageously, a manufacturing device executing a manufacturing step of a manufacturing process of optical lenses is monitored in an automated manner based on the detection of defects in a plurality of lenses each having undergone the manufacturing step.

During the manufacturing step S16, any type of modification of the optical lens is performed, or any combination thereof, including adding material to, removing material and/or conferring a specific function to the optical lens.

The defect detection step S12 may comprise the steps of a method for detecting a defect according to the invention.

During the recording step S17, at least one parameter of the optical lens is recorded. Said parameter is related to at least one defect detected during the defect detection step S12. The parameter may include any of the following or any possible combination thereof: the occurrence of a defect, the number of the detected defects, the occurrence of a defect in a specific position, the occurrence of a specific type of defect, the occurrence of a defect having a dimension exceeding a predetermined dimension, and the like.

During the defect evolution checking step S18, the evolution of the at least one parameter of the optical lens is checked over time.

Steps S16, S12 and S17 are repeated over time.

Moreover, the evolution of at least one parameter of the manufacturing device used during the optical lens manufacturing process is checked over time and the evolution over time of at least one parameter of the optical lens is related with the evolution over time of the at least one parameter of the manufacturing device. Accordingly, it is possible to monitor an evolution over time of the impact of said parameter of the manufacturing device on the appearance of the parameter of the optical lens. It is thus possible monitor a quality of the manufacturing device and thus plan accordingly maintenance plans or corrective actions.

Another object of the invention is an apparatus for detecting a defect in a zone of interest of an optical lens.

Figure 7:
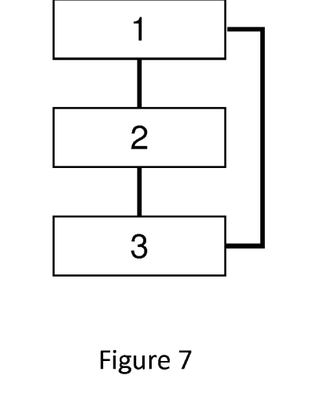
FIG. 7 is a schematic representation of an apparatus for detecting a defect in a zone of interest of an optical lens according to the invention.

As illustrated on FIG. 7, the apparatus for detecting a defect in a zone of interest of an optical lens according to the invention comprises at least:
  a memory 1,
  an image treatment unit 2, and
  detection means 3.

The memory 1 is configured to store at least two images, each image comprising a view of the zone of interest in front of a specific pattern, the secondary pattern viewed on the first image being different from the secondary pattern viewed on the second image, each secondary pattern comprising a bright area and a dark area, for each sample of the zone of interest, at least one image comprising a view of said sample in front of a dark area of a specific pattern, and at least one image being saturated in light intensity.

The view of the zone of interest in front of a specific pattern comprises a secondary pattern which is related to the above-mentioned specific pattern. The secondary pattern may be modulated by the possible saturation of light intensity, by the presence of a defect within or on the optical lens, by the optical power of the optical lens and/or by any optical factors linked to the apparatus used for taking the image and representing it. The image treatment unit 2 is configured to generate a recombined image based on the at least two images. The image treatment unit 2 may be a processing unit.

The detection means 3 are configured to detect a defect in the zone of interest of the optical lens based on the recombined image.

The memory 1, the image treatment unit 2 and the detection means 3 communicate with one another.

Advantageously, the apparatus allows detecting a defect in a zone of interest of an optical lens according to an automated process.

Figure 8:
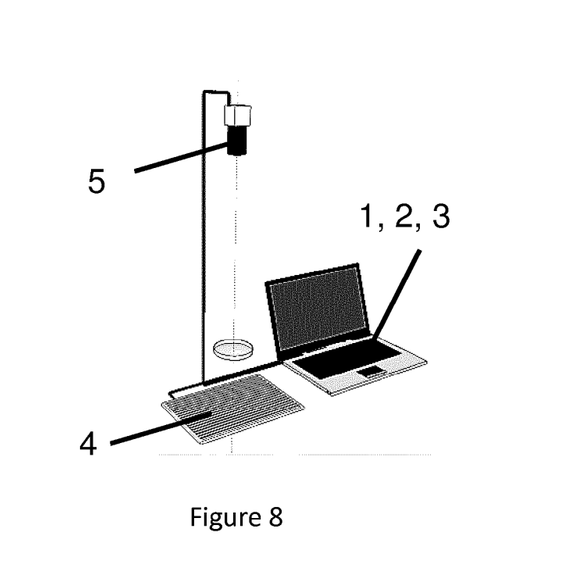
FIG. 8 is a schematic representation of an apparatus for detecting a defect in a zone of interest of an optical lens according to an embodiment of the invention.

As illustrated on FIG. 8, the apparatus for detecting a defect in a zone of interest of an optical lens according to the invention may further comprise:
  a display device 4; and/or
  an image acquisition device 5.

The display device 4 is positioned, or positionable, so as to face a first side of the optical lens and configured to illuminate the zone of interest of the optical lens according to a plurality of successive specific patterns comprising a bright area and a dark area. The display device 4 may be controlled by a processing unit communicating with a memory.

The image acquisition device 5 is configured and positioned, or positionable, so as to acquire at least two images, each image comprises a view from a second side of the optical lens of the zone of interest in front of a specific pattern. The image acquisition device 5 may be controlled by a processing unit communicating with a memory, and may communicate with the memory 1 in order to at least store the acquired images.

Another object of the invention is a computer program product comprising one or more stored sequences of instructions that are accessible to a processor and which, when executed by the processor, causes the processor to carry out the steps of a method according to the invention.

Another object of the invention is a computer readable medium carrying one or more sequences of instructions of the computer program product according to the invention.

Another object of the invention is a program which makes a computer execute at least a method of the invention.

Another object of the invention is a computer-readable storage medium having a program recorded thereon; where the program makes the computer execute at least a method of the invention.

Another object of the invention is a device comprising a processor adapted to store one or more sequence of instructions and to carry out at least one of the steps of a method according to the invention.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for detecting a defect in a zone of interest of an optical lens, the method comprising:
  receiving a plurality of images, each of the images comprising a view of the zone of interest in front of a plurality of specific patterns, each of the specific patterns comprising a bright area and a dark area, at least two of the received images being saturated in light intensity, the at least two received images having been acquired by a camera being overexposed;

sampling each image of the plurality of images based on a common sampling pattern;

determining a recombined image of the zone of interest based on the common sampling pattern; and detecting a defect in the zone of interest of the optical lens based on an analysis of the recombined image, the defect being detected by comparing, on the image, a local value of a parameter with the average value of the parameter in the entire zone of interest, the parameter comprising one or more of luminance and a gradient of luminance.

2. The method according to claim 1, wherein each of the received images is saturated in light intensity.

3. The method according to claim 2, further comprising:
receiving at least one set parameter for each sample according to a specific criteria based on the light intensity of the sample in each of the images, and
wherein the recombined image of the zone of interest is determined based on the common sampling pattern by selecting, for each sample from the plurality of images, the corresponding sample based on the at least one set parameter.

4. The method according to claim 2, wherein the defect is a diffusing defect.

5. The method according to claim 1, further comprising:
receiving at least one set parameter for each sample according to a specific criteria based on the light intensity of the sample in each of the images, and
wherein the recombined image of the zone of interest is determined based on the common sampling pattern by selecting, for each sample from the plurality of images, the corresponding sample based on the at least one set parameter.

6. The method according to claim 5, further comprising:
grouping the plurality of images into a first group of images and a second group of images different from the first group of images,
wherein during the recombining,
determining a first recombined image of the first group of images based on the common sampling pattern by selecting, for each sample from the first group of images, the corresponding sample based on the at least one set parameter,
determining a second recombined image of the second group of images based on the common sampling pattern by selecting, for each sample from the second group of images, the corresponding sample based on the at least one set parameter, and
determining a third recombined image based on the common sampling pattern by selecting, for each sample of the first and second recombined images, the corresponding sample based on the at least one set parameter.

7. The method according to claim 6, further comprising:
determining a first recombined image of the first group of images based on the common sampling pattern by selecting, for each sample from the first group of images, the corresponding sample having the lowest luminosity;
determining the second recombined image of the second group of images based on the common sampling pattern by selecting, for each sample from the second group of images, the corresponding sample having the lowest luminosity and determining the third recombined image based on the common sampling pattern by selecting, for each sample of the first and second recombined images, the corresponding sample having the highest luminosity.

8. The method according to claim 5, wherein the defect is a diffusing defect.

9. The method according to claim 6, wherein the defect is a diffusing defect.

10. The method according to claim 1, wherein the defect is a diffusing defect.

11. The method according to claim 1, wherein the view of the zone of interest in front of each specific pattern of the plurality of specific patterns comprises a secondary pattern which is related to the respective specific pattern, the plurality of specific patterns being disposed so that a superimposition of dark areas of all the secondary patterns is a dark area which occupies the entire space of the recombined image of the zone of interest.

12. The method according to claim 1, further comprising:
providing a system comprising
a display device,
a support for the optical lens, and an image acquisition device,
the system being configured so that when the optical lens is positioned on the support, the display device faces a first side of the optical lens and the image acquisition device faces a second side of the optical lens,
positioning the optical lens on the support,
displaying, by the display device, a specific pattern of the plurality of specific patterns,
acquiring, by the image acquisition device, one of the images comprising the view of the zone of interest in front of said specific pattern,
the displaying step and the image acquiring being repeated until each of the images is acquired.

13. The method according to claim 1, wherein at least one of the specific patterns comprises alternate bright and dark stripes.

14. The method according to claim 1, wherein a first specific pattern of the plurality of specific patterns comprises alternate bright and dark stripes, each of the bright and dark stripes extending along a first direction, and a second specific pattern of the plurality of specific patterns is a translation of the first specific pattern in a second direction substantially perpendicular to the first direction.

15. The method according to claim 1, wherein different specific patterns of the plurality of specific patterns comprise alternate bright and dark stripes, the stripes on a first specific pattern of the plurality of specific patterns are oriented in a first direction, and the stripes on a second specific pattern of the plurality of specific patterns are oriented in a second direction.

16. The method according to claim 1, wherein the dark area of at least one specific pattern of the plurality of specific patterns has a larger surface than the bright area of said specific pattern.

17. A method for sorting a plurality of optical lenses, the method comprising:
detecting at least one defect in the zone of interest of at least one optical lens according to the method of claim 1; and
sorting the plurality of optical lenses based at least on the at least one detected defect.

18. A method for comparing a first defect in a zone of interest of an optical lens during an optical lens manufacturing process, the method comprising:

detecting the first defect in the zone of interest of the optical lens according to the method of claim 1;

modifying the optical lens;

detecting a second defect in the zone of interest of the transformed optical lens; and comparing the first defect and the second defect.

19. A method for controlling an optical lens manufacturing process, the method comprising the steps of:
- a) manufacturing the optical lens according to a manufacturing process using a manufacturing device;
- b) detecting at least one defect in the zone of interest of the manufactured optical lens of according to the method of claim 1;
- c) recording the at least one detected defect; and
- d) regularly repeating steps a) to c) and checking an evolution of the at least one detected defect over time, wherein the evolution of at least one parameter of the manufacturing device used during the optical lens manufacturing process is checked over time and the evolution over time of at least one parameter of the optical lens is related with the evolution over time of the at least one parameter of the manufacturing device.

20. An apparatus for detecting a defect in a zone of interest of an optical lens according to the method of claim 1, the apparatus comprising:
- a memory configured to store at least two images of the plurality of images, each of the images comprising the view of the zone of interest in front of a specific pattern, the specific pattern viewed on the first image being different from the specific pattern viewed on the second image, each of the specific patterns comprising a bright area and a dark area, for each sample of the zone of interest, at least one image comprising a view of said sample in front of a dark area of a pattern, at least two of the images being saturated in light intensity having been acquired by a camera being overexposed;
- an image treatment device communicating with the memory, the image treatment device being configured to generate a recombined image based on the at least two images; and
- a detector configured to detect a defect in the zone of interest of the optical lens based on the recombined image, wherein the apparatus is configured to detect the defect by comparing, on the recombined image, a local value of a parameter with the average value of the parameter in the entire zone of interest, the parameter comprising one or more of luminance and a gradient of luminance, and wherein the at least two images are saturated in light intensity have been acquired by a camera being overexposed.

* * * * *